(12) United States Patent
Yie et al.

(10) Patent No.: US 8,976,779 B2
(45) Date of Patent: Mar. 10, 2015

(54) METHOD FOR DIFFERENTIAL PRECODING AND BASE STATION SUPPORTING SAME

(75) Inventors: Chung Ku Yie, Incheon (KR); Jeong Hwan Oh, Seoul (KR); Seok Hyun Yoon, Gwangmyeong-si (KR)

(73) Assignee: Humax Holdings Co., Ltd., Yongin-Si, Gyeonggi-Do (KR)

( * ) Notice: Subject to any disclaimer, the term of this patent is extended or adjusted under 35 U.S.C. 154(b) by 103 days.

(21) Appl. No.: 13/701,413

(22) PCT Filed: May 30, 2011

(86) PCT No.: PCT/KR2011/003952
§ 371 (c)(1),
(2), (4) Date: Nov. 30, 2012

(87) PCT Pub. No.: WO2011/152638
PCT Pub. Date: Dec. 8, 2011

(65) Prior Publication Data
US 2013/0070723 A1 Mar. 21, 2013

(30) Foreign Application Priority Data

Jun. 3, 2010 (KR) .................. 10-2010-0052380
May 25, 2011 (KR) .................. 10-2011-0049542

(51) Int. Cl.
*H04J 3/06* (2006.01)
*H04B 7/06* (2006.01)
*H04B 7/04* (2006.01)

(52) U.S. Cl.
CPC ............ *H04B 7/0639* (2013.01); *H04B 7/0641* (2013.01); *H04B 7/0452* (2013.01)
USPC ....................................... 370/350

(58) Field of Classification Search
CPC .. H04B 7/0639; H04B 7/0641; H04B 7/0417; H04B 7/0478; H04B 7/065; H04B 7/0663; H04L 25/0246; H04L 1/0687
USPC ................................. 370/310–350
See application file for complete search history.

(56) References Cited

U.S. PATENT DOCUMENTS

| 8,498,358 B2 * | 7/2013 | Clerckx et al. ............ 375/267 |
| 2004/0127221 A1 | 7/2004 | Takano et al. |
| 2008/0049709 A1 * | 2/2008 | Pan et al. ............ 370/344 |

(Continued)

FOREIGN PATENT DOCUMENTS

| CN | 1497999 A | 5/2004 |
| EP | 1 919 097 A1 | 5/2008 |
| EP | 1 919 098 A1 | 5/2008 |

OTHER PUBLICATIONS nahoko takano, mobile communication system, mobile station base station and its data pack communication method, May 19, 2004.*

*Primary Examiner* — Fan Ng
(74) *Attorney, Agent, or Firm* — Birch, Stewart, Kolasch & Birch, LLP

(57) ABSTRACT

Provided is a differential precoding method for reducing inter-user interference and increasing the sum rate. The differential precoding method comprises initializing a precoding matrix with a first (Precoding Matrix Indicator (PMI) for a channel between a mobile station and a base station; and updating the precoding matrix with a second PMI for the channel and side information for adaptively updating the precoding matrix according to a change speed of a state of the channel, wherein the side information has a quantized scalar value.

13 Claims, 2 Drawing Sheets

(56) References Cited

U.S. PATENT DOCUMENTS

| | | | |
|---|---|---|---|
| 2008/0273624 A1* | 11/2008 | Kent et al. | 375/296 |
| 2009/0003474 A1 | 1/2009 | Pan et al. | |
| 2009/0268827 A1 | 10/2009 | Clerckx et al. | |
| 2011/0013615 A1* | 1/2011 | Lee et al. | 370/344 |
| 2011/0026459 A1* | 2/2011 | Tsai et al. | 370/328 |
| 2012/0176996 A1* | 7/2012 | Kim et al. | 370/329 |
| 2012/0275409 A1* | 11/2012 | Han et al. | 370/329 |
| 2012/0320839 A1* | 12/2012 | Noh et al. | 370/329 |
| 2013/0010745 A1* | 1/2013 | Ko et al. | 370/329 |
| 2013/0016604 A1* | 1/2013 | Ko et al. | 370/216 |
| 2013/0028213 A1* | 1/2013 | Ko et al. | 370/329 |
| 2013/0083740 A1* | 4/2013 | Eriksson et al. | 370/329 |
| 2013/0094449 A1* | 4/2013 | Takeda et al. | 370/329 |
| 2013/0215862 A1* | 8/2013 | Suzuki et al. | 370/329 |
| 2013/0223300 A1* | 8/2013 | Yang et al. | 370/280 |
| 2014/0086112 A1* | 3/2014 | Stern-Berkowitz et al. | 370/280 |

\* cited by examiner

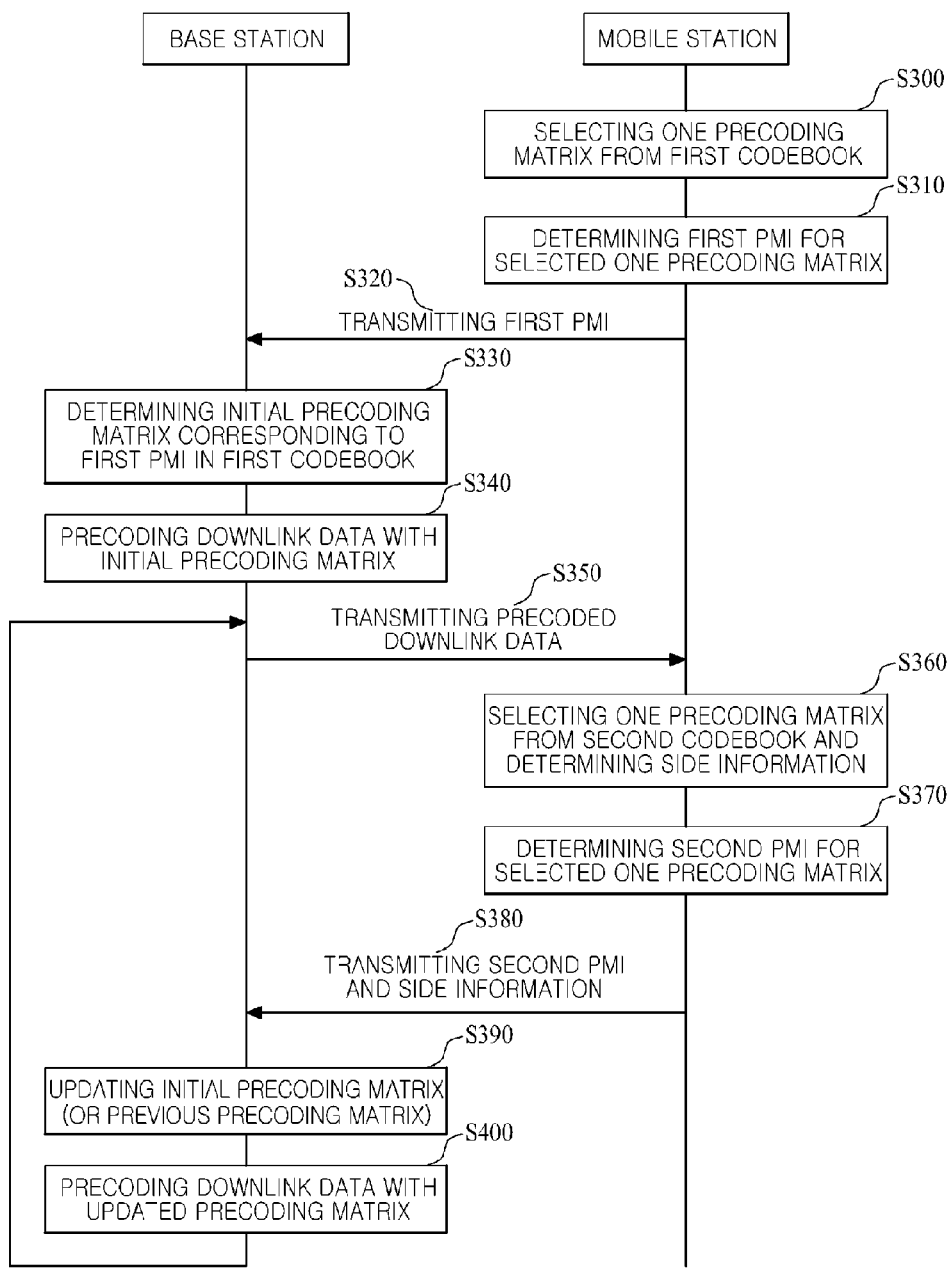

METHOD FOR DIFFERENTIAL PRECODING AND BASE STATION SUPPORTING SAME

TECHNICAL FIELD

The present invention relates to a wireless communication system, and more particularly, to differential precoding in a wireless communication system.

BACKGROUND ART

The Fourth Generation (4G) communication system enabling the high-speed transmission of large-scale data uses an Orthogonal Frequency Division Multiplexing (OFDM) scheme or an Orthogonal Frequency Division Multiplexing Access (OFDMA) scheme. The OFDM scheme or the OFDMA scheme divides a bandwidth into a plurality of subcarriers to transmit data, and specifically, converts a serially input data row into N number of parallel data rows (where N is a natural number equal to or more than two) and carries the parallel data rows in the respective divided subcarriers, thereby increasing a data rate.

To enhance the efficiency of data transmission, a communication system using the OFDM scheme or the OFDMA scheme uses a Multi-Input Multi-Out (MIMO) scheme in which a base station including a plurality of antennas transmits different data through the respective antennas. By using the MIMO scheme, the communication system can obtain a diversity gain and moreover increase a data transmission rate.

Especially, by using the MIMO scheme, data or signals are simultaneously transmitted and received between a base station and a plurality of mobile stations. In such a Multi-User (MU) MIMO scheme, M number of antennas (where M is a natural number equal to or more than two) are arranged in a base station, and N number of antennas are arranged in a plurality of mobile stations. In this way, signals are respectively transmitted and received through the arranged antennas, thereby increasing a transmission rate.

As described above, a precoding technique may be applied to the MU-MIMO scheme, for minimizing inter-user interference and maximizing the sum rate.

Here, precoding is a type of techniques for enhancing the reliability of data transmission in a wireless communication system, and denotes a technique that generates a precoding matrix on the basis of information on fading and interference which occur in a channel in transmitting data, precodes data to be transmitted with the precoding matrix, and transmits the precoded data, thereby enhancing the reliability of data transmission.

However, since the 4G mobile communication system uses codebook having a limited size and reports channel information in the forms of Channel Quality Indicator (CQI), Rank Indicator (RI), and Precoding Matrix Indicator (PMI) at present, available precoding matrixes are limited, and thus, there are limitations in reducing inter-user interference and increasing the sum rate.

DISCLOSURE

Technical Problem

An aspect of the present invention is directed to a method for differential precoding and a base station supporting the same, which can reduce inter-user interference and increase the sum rate.

Another aspect of the present invention is directed to a method for differential precoding and a base station supporting the same, which can determine a precoding matrix with a plurality of codebooks.

Another aspect of the present invention is directed to a method for differential precoding and a base station supporting the same, which can adaptively determine a precoding matrix according to the change speed of a channel.

Another aspect of the present invention is directed to a method for differential precoding and a base station supporting the same, which can reduce overheads caused by the feedback of channel state information.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these and other advantages and in accordance with the purpose of the invention, as embodied and broadly described herein, there is provided a method for differential precoding including: initializing a precoding matrix with a first (Precoding Matrix Indicator (PMI) for a channel between a mobile station and a base station; and updating the precoding matrix with a second PMI for the channel and side information for adaptively updating the precoding matrix according to a change speed of a state of the channel, wherein the side information has a quantized scalar value.

The method for differential precoding may further include: precoding downlink data with the initialized precoding matrix or the updated precoding matrix; and transmitting the precoded downlink data to the mobile station.

The precoding matrix may be initialized with the following Equation $$G(0) = F_{main,q}$$

where $G(0)$ denotes a precoding matrix at an zeroth time, and $F_{main,q}$ denotes a factor corresponding to the first PMI "q" in a main codebook.

The precoding matrix may be repeatedly updated with the following Equation $$G(n) = G(n-1) * (F_{sub,p})^a$$

where $G(n)$ is a precoding matrix at an nth time, $G(n-1)$ is a precoding matrix at an n−1st time, $F_{sub,q}$ denotes a factor corresponding to the second PMI "p" in a sub-codebook, * denotes an inter-matrix operator indicating one of a matrix addition, a matrix product, and a Kronecker product, and a denotes a value corresponding to the side information.

In another aspect of the present invention, there is provided a method for differential precoding including: precoding, when first Channel State Information (CSI) on a channel between a mobile station and a base station is received from the mobile station, first downlink data with a precoding matrix initialized with the first CSI to transmit the precoded first downlink data to the mobile station; updating, when second CSI on the channel and side information for adaptively updating the precoding matrix according to a change in a state of the channel are received from the mobile station, the precoding matrix with the side information and the second CSI; and precoding second downlink data with the updated precoding matrix to transmit the precoded second downlink data to the mobile station.

Each of the first and second CSI may be a PMI.

The method for differential precoding may further include: initializing the precoding matrix with a matrix corresponding to the first CSI in a first codebook; and performing a matrix product or a Kronecker product on the precoding matrix and a matrix raised to the power of the side information to update the precoding matrix, the matrix corresponding to the second CSI in a second codebook.

The side information may have a quantized scalar value.

Each of the first and second CSI may include at least one of a CQI and an RI.

In another aspect of the present invention, there is provided a method for differential precoding including: determining a first PMI indicating a first matrix selected from a first codebook, and feeding back the first PMI to a base station; determining a second PMI, indicating a second matrix selected from a second codebook, and side information that is used to extract the power of the second matrix, the side information being a quantized scalar value; and feeding back the second PMI and the side information to the base station periodically or aperiodically.

The method for differential precoding may further include receiving downlink data precoded with a precoding matrix initialized with the first matrix, or downlink data precoded with a precoding matrix updated with the precoding matrix and the second matrix raised to the power of the side information.

The updated precoding matrix may be calculated by performing a matrix product or a Kronecker product on the precoding matrix and the second matrix raised to the power of the side information.

In another aspect of the present invention, there is provided a base station including: a feedback receiver receiving first CSI, second CSI, and side information from a mobile station, the side information being used for adaptively updating a precoding matrix according to a change in a state of a channel; a precoder initializing the precoding matrix with the first CSI, repeatedly updating the precoding matrix with the second CSI and the side information, and precoding downlink data with the precoding matrix; and a data transmitter transmitting the downlink data to the mobile station.

The precoder may include: a precoding matrix initialization unit initializing the precoding matrix with Equation "$G(0)=F_{main,q}$"; and a precoding matrix update unit repeatedly updating the precoding matrix with Equation "$G(n)=G(n-1)*(F_{sub,p})^a$"

where $G(0)$ denotes a precoding matrix at an zeroth time, $F_{main,q}$ denotes a factor corresponding to the first PMI "q" in a main codebook, $G(n)$ is a precoding matrix at an nth time, $G(n-1)$ is a precoding matrix at an n-1st time, $F_{sub,q}$ denotes a factor corresponding to the second PMI "p" in a sub-codebook, * denotes an inter-matrix operator indicating one of a matrix addition, a matrix product, and a Kronecker product, and a denotes a value corresponding to the side information.

It is to be understood that both the foregoing general description and the following detailed description of the present invention are exemplary and explanatory and are intended to provide further explanation of the invention as claimed.

Advantageous Effects

According to embodiments, the present invention can reduce inter-user interference and increase the sum rate.

Moreover, the present invention can determine a precoding matrix with a plurality of codebooks, thus mitigating the restrictions of available precoding matrixes.

Moreover, by feeding back both channel information and side information, the present invention can adaptively determine a precoding matrix according to the change speed of a channel.

Moreover, the present invention can reduce overheads caused by the feedback of channel state information.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 3 is a flowchart illustrating the differential precoding method according to an embodiment of the present invention.

MODE FOR INVENTION

Figure 1:
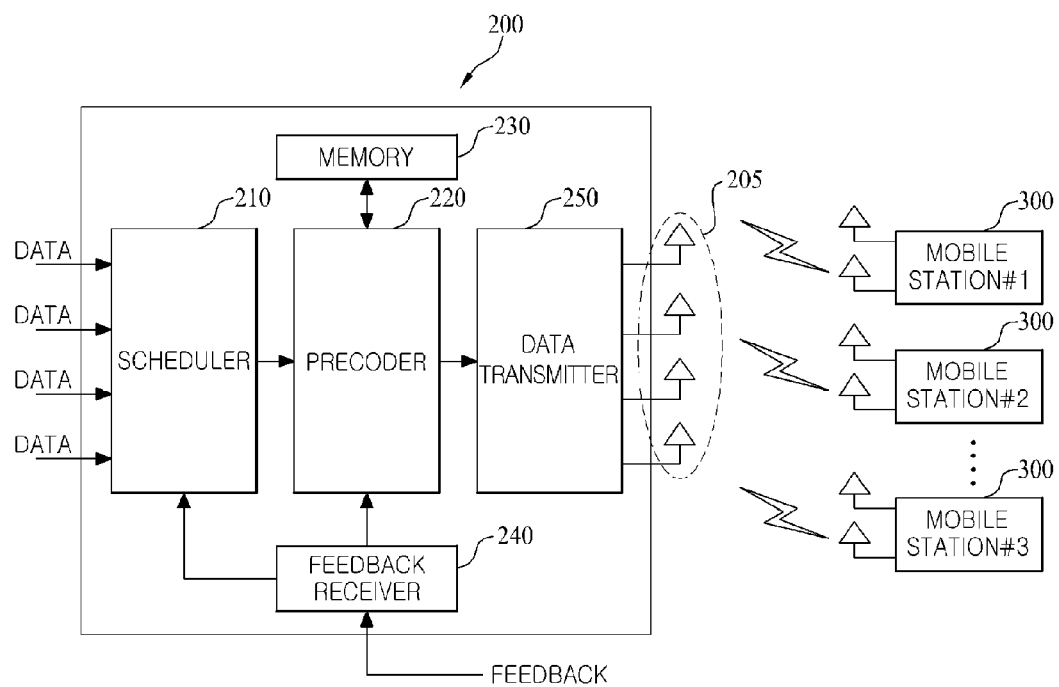
FIG. 1 is a block diagram schematically illustrating a configuration of a base station that supports a differential precoding method in a wireless communication system, according to an embodiment of the present invention.

In the below description, for convenience of a description, a user and a terminal are used as the same concept, and a cell and a base station are used as the same concept.

In the specification, a description is made for exemplary embodiments of the present invention, and is not made for a single embodiment of the present invention. Also, in the below description, a description on a known structure or apparatus may not be provided for avoiding the ambiguousness of the core features of the present invention.

Moreover, in the below-described embodiments, each element or feature should be considered to be selective unless there is no clear statement. Therefore, each element or feature may be embodied without being combined with another element or feature, or the embodiments of the present may be configured by combing some elements or features. Also, in the embodiments of the present invention, the order of described operations may be changed, and some elements or features in a specific embodiment may be included in another embodiment or replaced with a corresponding element or feature in another embodiment.

Embodiments of the present invention will be described on a data transmission and reception relationship between a base station and a terminal. Here, the base station denotes a terminal node of a network that performs communication directly with the terminal. In the specification, a specific operation that is described as being performed by the base station may be performed by an upper node of the base station, depending on the case. That is, various operations, which are performed for communication with the terminal over a network configured with a plurality of network nodes including the base station, may be performed by the base station or the other network nodes other than the base station. The base station may be replaced by a term such as a fixed station, an Node B, an eNode B (eNB), or an access point, and the terminal may be replaced by a term such as user equipment (UE), a mobile station (MS), a mobile subscriber station (MSS).

Moreover, a data transmission method and apparatus according to the present invention may be applied to various wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

The wireless access technologies may be implemented as various wireless communication standard systems. For example, wideband CDMA (WCDMA) may be implemented as wireless technology such as Universal Terrestrial Radio Access Network (UTRAN) according to 3rd Generation Partnership Project (3GPP) standard organization. Also, CDMA2000 is CDMA-based wireless technology, and High Rate Packet Data (HRPD) according to 3rd Generation Partnership Project 2 (3GPP2) standard organization is wireless technology that provides a high packet data service in a CDMA2000-based system. evolved HRPD (eHRPD) is wireless technology in which HRPD has been advanced, and TDMA may be implemented as wireless technology such as Global System for Mobile communications (GSM)/General Packet Radio Service (GPRS)/Enhanced Data Rates for GSM Evolution (EDGE). OFDMA may be implemented as wireless technology such as IEEE 802.11 (Wi-Fi), IEEE 802.16 (WiMAX), IEEE 802-20, or EUTRAN (Evolved-UTRAN). Long Term Evolution (LTE) is a portion of Evolved-UMTS (E-UMTS) using E-UTRAN. LTE applies OFDMA in a downlink, and applies Single Carrier Frequency Division Multiple Access (SC-FDMA) in an uplink. LTE-Advanced (LTE-A) is wireless technology in which LTE has been advanced.

The MIMO system, to which present invention is applied, is a system that uses multi transmission antennas and at least one reception antenna. The present invention may be applied to various MIMO schemes. In the MIMO schemes, there are a spatial diversity scheme that transmits the same stream through multi layers, and a spatial multiplexing scheme that transmits a multi-stream through multi layers. In the spatial multiplexing scheme, a multi-stream being transmitted to one user denotes Single User-MIMO (SU-MIMO) or Spatial Division Multiple Access (SDMA). In the spatial multiplexing scheme, a multi-stream being transmitted to multi users denotes Multi User-MIMO (MU-MIMO). Also, each of the spatial diversity scheme and the spatial multiplexing scheme may be categorized into an open-loop scheme and a closed-loop scheme according to whether to use feedback information that is reported from users.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

FIG. 1 is a block diagram schematically illustrating a configuration of a base station included in a wireless communication system according to an embodiment of the present invention. A base station 200 according to the present invention may transmit data to multi users in an MIMO scheme. In this case, a plurality of transmission antennas 205 are arranged in the base station 200, and a plurality of antennas are arranged in each of a plurality of mobile stations 300. However, one antenna may be arranged in each mobile station 300.

As illustrated in FIG. 1, the base station 200 includes a scheduler 210, a precoder 220, a memory 230, a feedback receiver 240, and a data transmitter 250.

The scheduler 210 performs a scheduling operation for transmission of data received from an upper layer, in consideration of Channel State Information (CSI) fed back from each mobile station 300. Specifically, the scheduler 210 determines the Modulation and Coding Scheme (MCS) levels of downlink data to be transmitted to the respective mobile stations 300 in consideration of the CSI fed back from each mobile station 300, and provides the downlink data to the precoder 220.

In an embodiment, the CSI fed back from each mobile station 300 may be a Precoding Matrix Indicator (PMI). In another embodiment, the CSI may further include Channel Quality Indicator (CQI) and a Rank Indicator (RI).

In the following description, for convenience, the CSI is assumed as being the PMI.

The precoder 220 determines a precoding matrix, and precodes downlink data supplied from scheduler 210 with the determined precoding matrix. The precoder 220 includes a precoding matrix initialization unit and a precoding matrix update unit.

When a first PMI that is the initial PMI is fed back from the mobile station 300, the precoding matrix initialization unit initializes the precoding matrix with a factor corresponding to the first PMI in a first codebook stored in the memory 230. That is, when the first PMI is fed back, the precoding matrix initialization unit initializes the precoding matrix as expressed in Equation (1).

$$G(0) = F_{main,q} \qquad \text{[Equation 1]}$$

where G(n) denotes a precoding matrix at an nth time, G(0) is an initialized precoding matrix, and $F_{main,q}$ denotes a factor corresponding to the first PMI "q" in a main codebook that is the first codebook.

Subsequently, the precoding matrix initialization unit precodes downlink data with the initialized precoding matrix, provides the precoded downlink data to the data transmitter 250, and stores the initialized precoding matrix in the memory 230.

Subsequently, the precoding matrix update unit updates the initialized precoding matrix, or repeatedly updates the updated precoding matrix periodically or aperiodically.

In detail, when both side information and a second PMI are periodically or aperiodically fed back from the mobile station 300, the precoding matrix update unit updates the initialized precoding matrix or a precoding matrix (hereinafter referred to as a previous precoding matrix) applied to previous downlink data, by using the side information, and a factor that corresponds to a second PMI in a second codebook stored in the memory 230.

Here, the side information is a value determined by the mobile station 300 such that a precoding matrix to be finally applied to downlink data is appropriately updated according to the change in a channel state, and may be a quantized scalar value.

In an embodiment, the precoding matrix update unit performs a matrix addition, a matrix product, or a Kronecker product on the initialized precoding matrix (or the previous precoding matrix) and a factor (corresponding to the second PMI in the second codebook) raised to the power of a value (corresponding to the side information), thereby updating the initialized precoding matrix (or the previous precoding matrix).

This is expressed as the following Equation (2).

$$G(n)=G(n-1)*(F_{sub,p})^a \qquad \text{[Equation 2]}$$

where G(n) is a precoding matrix at an nth time and denotes a precoding matrix at a current time, G(n−1) is a precoding matrix at an n−1st time and denotes the previous precoding matrix, $F_{sub,q}$ denotes a factor corresponding to the second PMI "p" in a sub-codebook that is the second codebook, * denotes an inter-matrix operator such as a matrix addition, a matrix product, or the Kronecker product, and a denotes a value corresponding to the side information.

Subsequently, the precoding matrix update unit precodes downlink data with the updated precoding matrix, provides the precoded downlink data to the data transmitter 250, and stores the updated precoding matrix in the memory 230.

As described above, since the base station 200 according to the present invention reflects the side information (which is fed back from the mobile station 300) in the factor corresponding to the second PMI in the form of the power, the base station 200 can adaptively adjust the change width of a precoding matrix according to the change speed of a channel state, and moreover reduce a steady-state error between the optimal precoding matrix and an actually calculated precoding matrix.

In the above-described embodiment, the precoding matrix initialization unit and the precoding matrix update unit have been described as different elements, but are not limited thereto. In a modification embodiment, the precoding matrix initialization unit and the precoding matrix update unit may be implemented as one body.

The memory 230 stores the precoding matrix (for example, the initialized precoding matrix and the updated precoding matrix) determined by the precoder 220, the first codebook, and the second codebook. In the present embodiment, the memory has been described as storing two codebooks, but is not limited thereto. In a modification embodiment, when two or more codebooks are used, the memory may store the two or more codebooks.

In an embodiment, the first codebook stored in the memory 230 may be an Rel-8 type of codebook, and the second codebook may be a sub-codebook determined from the first codebook.

The feedback receiver 240 receives feedback information from each mobile station 310, and provides the feedback information to the scheduler 210 and the precoder 220.

As described above, the feedback information fed back from each mobile station 300 to the feedback receiver 240 includes the first and second PMIs and the side information, and moreover may include the CQI indicating CSI and the RI indicating rank information.

The data transmitter 250 provides the precoded downlink data to the respective mobile stations 300 through the transmission antennas 2005.

Figure 2:
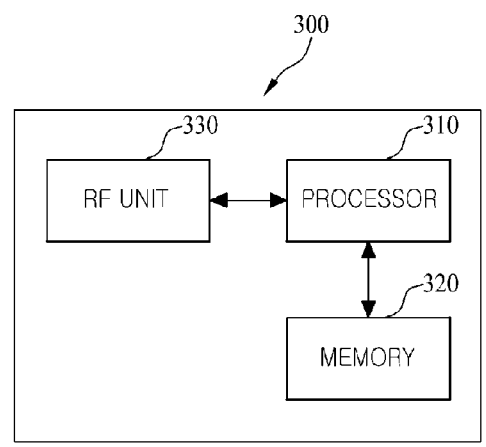
FIG. 2 is a block diagram schematically illustrating a configuration of a mobile station that supports the differential precoding method in the wireless communication system, according to an embodiment of the present invention.

FIG. 2 is a block diagram schematically illustrating a configuration of a mobile station that supports the differential precoding method in the wireless communication system, according to an embodiment of the present invention. Each of the mobile stations 300 according to the present invention includes a processor 310, a memory 320, and a Radio Frequency (RF) unit 330.

The processor 310 receives a reference signal from the base station 200, and estimates a channel between the base station 200 and the mobile station 300 with the received reference signal. The processor 310 selects one of precoding matrixes included in the first codebook shared between the mobile station 300 and the base station 200 according to the channel estimation result, and determines a first PMI indicating the selected first precoding matrix.

Moreover, the processor 310 selects one of precoding matrixes included in the second codebook periodically or aperiodically according to the channel-state change between the base station 200 and the terminal 300, and determines a second PMI indicating the selected precoding matrix. Here, as in the first codebook, the second codebook is shared in advance between the base station 200 and the mobile station 300.

In determining the second PMI, the processor 310 may determine side information that enables the appropriate update of a precoding matrix to be applied to downlink data according to the change speed of a channel state. Here, the side information may be a quantized scalar value.

When the channel state is rapidly changed, the side information leads to the increase in the change width of a precoding matrix to be finally applied to downlink data. When the channel state is slowly changed, the side information leads to the decrease in the change width of the precoding matrix to be finally applied to the downlink data.

In addition, layers of wireless interface protocols may be implemented by the processor 310.

The memory 320 is connected to the processor 310, and stores various information for driving the processor 310, the first and second PMIs, the first and second codebooks, etc.

The RF unit 330 is connected to the processor 310, and feeds back the first and second PMIs and the side information to the base station 200 or transmits uplink data to the base station 200.

Moreover, the RF unit 330 receives downlink data from the base station 200, and transfers the downlink data to the processor 310.

In the above-described embodiments, the processor 310 may include an Application-Specific Integrated Circuit (ASIC), a different chipset, a logic circuit, a data processing apparatus, and/or a converter that reciprocally converts a baseband signal and an RF signal.

Each of the memories 230 and 320 may include a Read-Only Memory (ROM), a Random Access Memory (RAM), a flash memory, a memory card, a storage medium, and/or a different storage device. The RF unit 330 may include one or more antennas transmitting and/or receiving the RF signal.

Hereinafter, the differential precoding method according to the present invention will be described in detail.

FIG. 3 is a flowchart illustrating the differential precoding method according to an embodiment of the present invention.

As illustrated in FIG. 3, a mobile station selects one matrix from a first codebook in consideration of a channel state in operation S300, determines a first PMI indicating the selected matrix in operation S310, and transmits the first PMI to a base station in operation S320. Here, the first codebook is shared in advance between the base station and the mobile station.

Subsequently, the base station determines an initial precoding matrix corresponding to the first PMI in the first codebook in operation S330.

Subsequently, the base station precodes downlink data with the initial precoding matrix in operation S340, and transmits the precoded downlink data to the mobile station in operation S350.

Subsequently, the mobile station selects one precoding matrix from a second codebook periodically or aperiodically, and determines side information for updating the precoding matrix at the base station in operation S360. Here, the second codebook is shared in advance between the base station and the mobile station.

In an embodiment, the side information may be a quantized scalar value, and a value of the side information may be determined in consideration of the change speed of a channel state. For example, the side information may be set to have a value that allows the update width of a precoding matrix to increase when the channel state is rapidly changed and, when the channel state is slowly changed, allows the update width of the precoding matrix to decrease.

Subsequently, the mobile station determines a second PMI indicating the one precoding matrix selected from the second codebook in operation S370, and transmits both the determined second PMI and the side information to the base station in operation S380.

In the above-described embodiment, it has been described that the side information is determined and then the second PMI is determined, but the present embodiment is not limited thereto. In a modification embodiment, the second PMI may be determined and then the side information may be determined, or the second PMI and the side information may be determined simultaneously.

Subsequently, the base station updates the initial precoding matrix with the side information and a matrix which corresponds to the second PMI in the second codebook, in operation S390. Specifically, as expressed in Equation (2), the base station performs a matrix product or a Kronecker product on the initial precoding matrix and a matrix raised to the power of the value of the side information, thereby updating the initial precoding matrix.

Subsequently, the base station precodes downlink data with the updated precoding matrix in operation S400, and transmits the precoded downlink data in the mobile station in operation S350.

Subsequently, by repeatedly performing operations S360 to S400, the updated precoding matrix is repeatedly updated.

That is, it has been described in operation S390 that the initial precoding matrix is updated, but, in a repeated operation, a previously updated precoding matrix is again updated with the side information and the matrix corresponding to the second PMI.

The above-described differential precoding method may be implemented in the form of a program executable with various computer means, in which case a program for executing a frame transmission method using precoding for supporting MU-MIMO is stored in a computer-readable record medium such as a hard disk, a CD-ROM, a DVD, a ROM, a RAM, or a flash memory.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for differential precoding, the method comprising:
   initializing a precoding matrix with a first Precoding Matrix Indicator (PMI) for a channel between a mobile station and a base station; and
   updating the precoding matrix with a second PMI for the channel and side information for adaptively updating the precoding matrix according to a change speed of a state of the channel,
   wherein the side information has a quantized scalar value, and
   wherein the precoding matrix is repeatedly updated with the following Equation:

$$G(n)=G(n-1)*(F_{sub,p})^a,$$

where $G(n)$ is a precoding matrix at an nth time, $G(n-1)$ is a precoding matrix at an n−1st time, $F_{sub,q}$ denotes a factor corresponding to the second PMI "p" in a sub-codebook, * denotes an inter-matrix operator indicating one of a matrix addition, a matrix product, and a Kronecker product, and a denotes a value corresponding to the side information.

2. The method of claim 1, further comprising:
   precoding downlink data with the initialized precoding matrix or the updated precoding matrix; and
   transmitting the precoded downlink data to the mobile station.

3. The method of claim 1, wherein the precoding matrix is initialized with the following Equation:

$$G(0)=F_{main,q},$$

where $G(0)$ denotes a precoding matrix at a zeroth time, and $F_{main,q}$ denotes a factor corresponding to the first PMI "q" in a main codebook.

4. A method for differential precoding, the method comprising:
   precoding, when first Channel State Information (CSI) on a channel between a mobile station and a base station is received from the mobile station, first downlink data with a precoding matrix initialized with the first CSI to transmit the precoded first downlink data to the mobile station;
   updating, when second CSI on the channel and side information for adaptively updating the precoding matrix according to a change in a state of the channel are received from the mobile station, the precoding matrix with the side information and the second CSI; and
   precoding second downlink data with the updated precoding matrix to transmit the precoded second downlink data to the mobile station,
   wherein the precoding matrix is initialized with a matrix corresponding to the first CSI in a first codebook, and
   wherein the precoding matrix is updated by performing a matrix product or a Kronecker product on the precoding matrix and a matrix raised to the power of the side information, the matrix corresponding to the second CSI in a second codebook.

5. The method of claim 4, wherein each of the first and second CSI is a Precoding Matrix Indicator (PMI).

6. The method of claim 4, wherein the side information has a quantized scalar value.

7. The method of claim 4, wherein each of the first and second CSI comprises at least one of a Channel Quality Indicator (CQI) and a Rank Indicator.

8. A method for differential precoding, the method comprising:
   determining a first Precoding Matrix Indicator (PMI) indicating a first matrix selected from a first codebook, and feeding back the first PMI to a base station;
   determining a second PMI, indicating a second matrix selected from a second codebook, and side information that is used to extract the power of the second matrix, the side information having a quantized scalar value; and
   feeding back the second PMI and the side information to the base station periodically or aperiodically.

9. The method of claim 8, further comprising receiving downlink data precoded with a precoding matrix initialized with the first matrix, or downlink data precoded with a precoding matrix updated with the precoding matrix and the second matrix raised to the power of the side information.

10. The method of claim 9, wherein the updated precoding matrix is calculated by performing a matrix product or a Kronecker product on the precoding matrix and the second matrix raised to the power of the side information.

11. A base station, comprising:
a feedback receiver receiving first Channel State Information (CSI), second CSI, and side information from a mobile station, the side information being used for adaptively updating a precoding matrix according to a change in a state of a channel;
a precoder initializing the precoding matrix with the first CSI, repeatedly updating the precoding matrix with the second CSI and the side information, and precoding downlink data with the precoding matrix; and
a data transmitter transmitting the downlink data to the mobile station,
wherein the precoder comprises:
a precoding matrix initialization unit initializing the precoding matrix with Equation "$G(0)=F_{main,q}$"; and
a precoding matrix update unit repeatedly updating the precoding matrix with Equation "$G(n)=G(n-1)*(F_{sub,p})^a$",
where $G(0)$ denotes a precoding matrix at a zeroth time, $F_{main,q}$ denotes a factor corresponding to the first PMI "q" in a main codebook, $G(n)$ is a precoding matrix at an nth time, $G(n-1)$ is a precoding matrix at an n−1st time, $F_{sub,q}$ denotes a factor corresponding to the second PMI "p" in a sub-codebook, * denotes an inter-matrix operator indicating one of a matrix addition, a matrix product, and a Kronecker product, and a denotes a value corresponding to the side information.

12. The base station of claim 11, wherein each of the first and second CSI is a PMI.

13. The base station of claim 11, wherein the side information has a quantized scalar value.

* * * * *